(12) United States Patent
Bruna et al.

(10) Patent No.: US 8,150,181 B2
(45) Date of Patent: Apr. 3, 2012

(54) METHOD OF FILTERING A VIDEO SEQUENCE IMAGE FROM SPURIOUS MOTION EFFECTS

(75) Inventors: Arcangelo Ranieri Bruna, San Cataldo (IT); Sebastiano Battiato, Aci Catena (IT); Giovanni Puglisi, S. Venerina (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 701 days.

(21) Appl. No.: 12/272,591

(22) Filed: Nov. 17, 2008

(65) Prior Publication Data

US 2010/0124379 A1    May 20, 2010

(51) Int. Cl.
*G06K 9/46* (2006.01)

(52) U.S. Cl. .......................... 382/236; 382/239; 382/254

(58) Field of Classification Search .................. 382/236, 382/254, 239, 154; 345/603, 530, 555; 375/240.02, 375/240.12, E7.093, E7.094; 348/416.1; 709/247

See application file for complete search history.

(56) References Cited

U.S. PATENT DOCUMENTS 7,831,088 B2 * 11/2010 Frakes et al. .................. 382/154

FOREIGN PATENT DOCUMENTS

JP     410013718 A  *  1/1998

OTHER PUBLICATIONS

Auberger, S. et al., "Digital Video Stabilization Architecture for Low Cost Devices," Proceedings of the 4th International Symposium on Image and Signal Processing and Analysis, pp. 474-479, 2005.
Chang, J. et al., "Digital Image Translation and Rotational Motion Stabilization Using Optical Flow Technique," IEEE Transactions on Consumer Electronics, 48(1):108-115, Feb. 2002.
Haupt, R. et al., "Practical Genetic Algorithms," Second Edition, 30 pages, John Wiley & Sons, Inc., Hoboken, New Jersey, 2004.
Soldatov, S. et al., "Low Complexity Global Motion Estimation from Block Motion Vectors," http://graphics.cs.msu.ru/en/publications/text/ks_sccg06.pdf, 7 pages, accessed Nov. 15, 2008.

(Continued)

*Primary Examiner* — Anh Hong Do
(74) *Attorney, Agent, or Firm* — Seed IP Law Group PLLC

(57) ABSTRACT

According to the novel method, roto-translational and zooming parameters describing spurious motion effects are determined by exploiting any of the many block matching algorithms commonly used for motion estimation for calculating a motion vector for all or for a selected number of blocks of pixels of the current frame that is processed. Some of the so calculated motion vectors are not taken into account for estimating spurious motion effects. The roto-translational and zooming parameters describing what is considered to be spurious global motion between a current frame and the precedent frame of the sequence, are calculated by processing the selected motion vectors of blocks of pixels of the frame through a recursive procedure that includes computing error values and readjusting the roto-translational and zooming parameters based on the error values.

28 Claims, 14 Drawing Sheets

OTHER PUBLICATIONS

Sugeno, Michio, "Industrial Applications of Fuzzy Controls," 22 pages, Elsevier Science Publishers B. V., Amsterdam, Netherlands, 1985.

Tico, M. et al., "Method of Motion Estimation for Image Stabilization," Proceedings of IEEE International Conference on Acoustics, Speech, and Signal Processing (ICASSP), vol. 2:277-280, Toulouse, France, May 14-19, 2006.

Vella, F. et al., "Digital Image Stabilization by Adaptive Block Motion Vectors Filtering," IEEE Transactions on Consumer Electronics, 48(3):796-801, Aug. 2002.

Yang, J. et al., "Online Video Stabilization Based on Particle Filters,"IEEE International Conference on Image Processing, 4 pages, 2006.

* cited by examiner

METHOD OF FILTERING A VIDEO SEQUENCE IMAGE FROM SPURIOUS MOTION EFFECTS

BACKGROUND

1. Technical Field

This disclosure relates to motion estimation algorithms and more particularly to a method of filtering an image of a video sequence from spurious motion effects.

2. Description of the Related Art

Algorithms of motion estimation generally identify corresponding pixels of two successive images (frames), typically pixels pertaining to a same object depicted in the two frames.

Essentially there are three different types of motion estimation algorithms:
- optical flux estimation algorithms [1], wherein motion is estimated pixel by pixel for each frame;
- local motion estimation algorithms, wherein for each block of pixels of an image a corresponding motion vector is calculated. An example of motion algorithms of this type are the so-called block matching algorithms [2, 3, 4, 5];
- global motion estimation algorithms [6], wherein a single motion vector is calculated for every frame.

BRIEF SUMMARY

A novel effective method of filtering an image of a video sequence from spurious motion effects has been found.

According to the novel method, roto-translational and zooming parameters describing spurious motion effects are determined by exploiting any of the many block matching algorithms commonly used for motion estimation for calculating a motion vector for all or for a selected number of blocks of pixels of the current frame that is processed.

Some of the so calculated motion vectors are not taken into account for estimating spurious motion effects. The criteria that are applied for deciding which of the motion vectors should be discarded in estimating spurious motion effects are:
- deselecting motion vectors strongly different from motion vectors of surrounding block of pixels;
- deselecting motion vectors of blocks of pixels pertaining to homogeneous areas of the image;
- deselecting motion vectors of blocks of pixels of the current frame dissimilar to the corresponding blocks of pixels of the preceding frame.

The roto-translational and zooming parameters describing what is considered to be spurious global motion between a current frame and the precedent frame of the sequence, are calculated by processing the selected motion vectors of blocks of pixels of the frame through the following recursive procedure:
- calculating, for each motion vector, a corresponding expected motion vector estimated in function of roto-translational and zooming parameters relative to the precedent frame in the sequence and at least an error value relative to the motion vector of the corresponding block of the precedent frame and the estimated motion vector,
- comparing the error values with at least a first threshold and storing in a memory the current motion vectors having error values which are smaller than the first threshold and deleting from the memory the previously-stored motion vectors having error values which are larger than the first threshold,
- calculating the roto-translational and zooming parameters for the current frame in function of the current motion vectors and of the motion vectors stored in the memory.

A consequently filtered output frame is generated from the current frame of an input video sequence. Therefore, spurious motion effects thus described by the roto-translational and zooming parameters are effectively filtered out.

DETAILED DESCRIPTION

Figure 1:
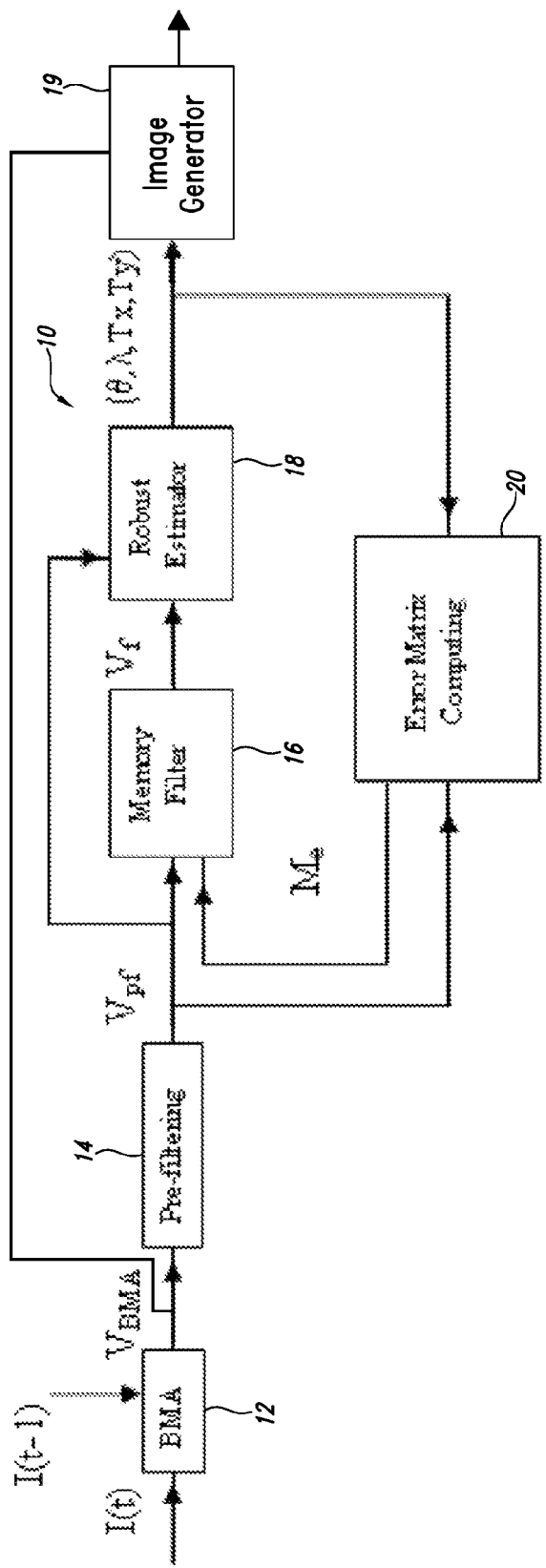
FIG. 1 shows a basic embodiment of a system for estimating roto-translational and zooming parameters of video sequence frames.

According to a first exemplary embodiment illustrated in FIG. 1, a device 10 that implements a novel stabilization algorithm (elimination of spurious motion) includes the following modules: BMA (Block Matching Algorithm) module 12; pre-filter 14; memory filter 16; robust estimator 18; output image generator 19, and error matrix computer 20.

BMA (BLOCK MATCHING ALGORITHM) 12: Starting from a pair of consecutive frames it computes the local motion vectors VBMA, for example, through a BM (block matching) algorithm.

PRE-FILTERING 14: It filters VBMA vectors applying simple rules based on good match, block homogeneity and similarity with vectors of nearby blocks, producing filtered vectors Vpf.

MEMORY FILTER 16: The Vpf vectors further filtered using specific information collected from the preceding iteration. A fixed percentage of the calculated new local vectors (not belonging to Vpf at time t−1) together with vectors too different respect to previous estimation are filtered out providing fully filtered local vectors Vf.

ROBUST ESTIMATOR 18: It estimates the inter-frame roto-translational and zooming parameters through least squares iterations.

IMAGE GENERATOR 20: It generates an output image based on the motion vectors computed by the BMA 12 and compensates for the spurious motion based on the inter-frame roto-translational and zooming parameters output by the robust estimator 18, according to known techniques. For example, if a current image is rotated in respect to the precedent image by a certain degree alpha, then the corresponding output image is generated by counter-rotating the current image by the angle alpha.

ERROR MATRIX COMPUTING 20: For each pre-filtered Vpf local vector it computes an error based on inter-frame transformation parameters. This error information Me is provided to the memory filter block.

Figure 2:
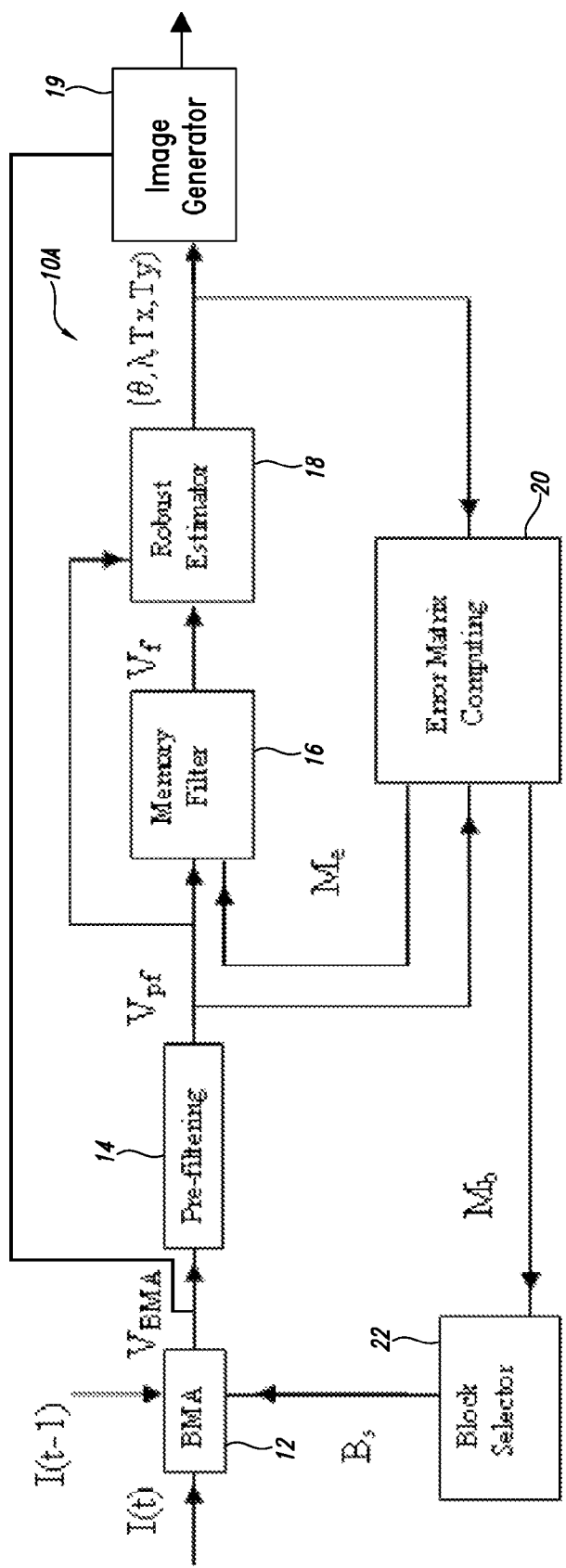
FIG. 2 shows an alternative embodiment of the system for estimating roto-translational and zooming parameters of video sequence frames wherein only selected blocks of pixels of a filed are processed.

In device 10A according to an alternative embodiment, depicted in FIG. 2, the block matching algorithm is not carried out on all the blocks of pixels of the image, but only on a reduced number $B_s$ thereof. To this purpose, a block selector 22 selects a set of block positions ($B_s$) in which local motion vectors are to be estimated by the block BMA on the basis of recent block history (modifications occurred in recent frames of the video sequence) and/or on random criteria. The error information Me generated by the error matrix computer 20 is used by the block selector 22.

Figure 3:
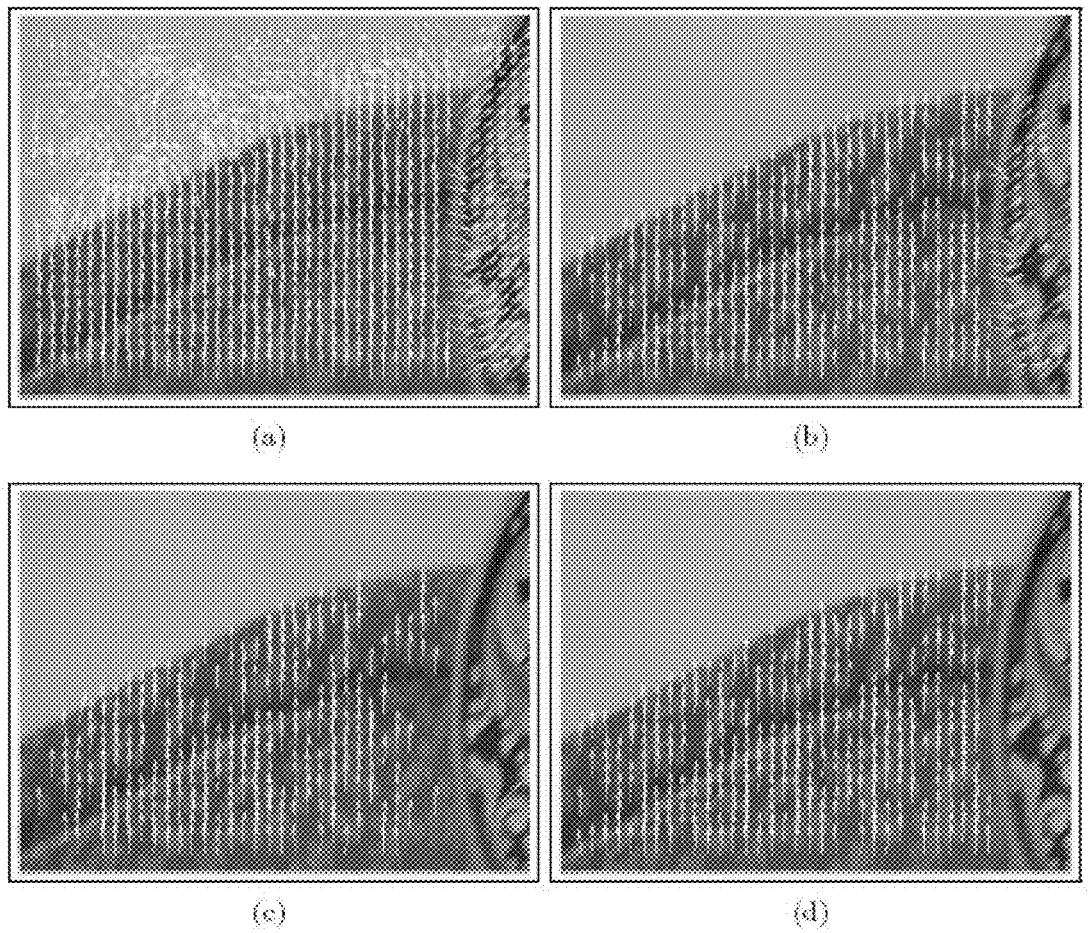
FIG. 3 illustrates by way of an example the functioning of the innovative systems of FIGS. 1 and 2.

FIG. 3 illustrates an example of vector filtering wherein only reliable motion vectors ($V_f$) are retained for utilization by the robust estimator 18. More in detail, FIG. 3a) illustrates motion vectors VBMA of an image of a video sequence obtained with the block matching algorithm; FIG. 3b) illustrates motion vectors Vpf generated with the pre-filtering step; FIG. 3c) illustrates motion vectors Vf selected by the memory filter; FIG. 3d) illustrates motion vectors used by the robust estimator for calculating the roto-translational and zooming parameters.

Block Selector

In order to reduce complexity (calculation burden) of the algorithm, a selection of the blocks of pixels in computing local motion vectors may be done. The selection takes into account block history (typically a significant block at time t remains so even at time t+1), and random insertion (i.e. variability of the scene must also be considered). In demanding real time applications, a fixed upper bound of the number of operations must be set. In particular the maximum number of blocks in which computing local motion vector is set in advance. This upper bound is defined: maxVectorsNumber. The algorithm considers two percentage thresholds: selectHistory and selectRandom (their sum being equal to one). These thresholds decide the number of vectors (blocks) to be selected on account of their history (selectHistory*maxVectorNumber) and in a random way (selectRandom*maxVectorNumber).

Figure 4:
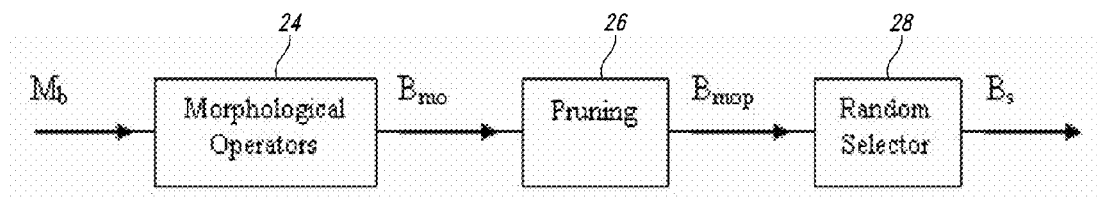
FIG. 4 shows details of the block selector of the system of FIG. 2.
Figure 5:
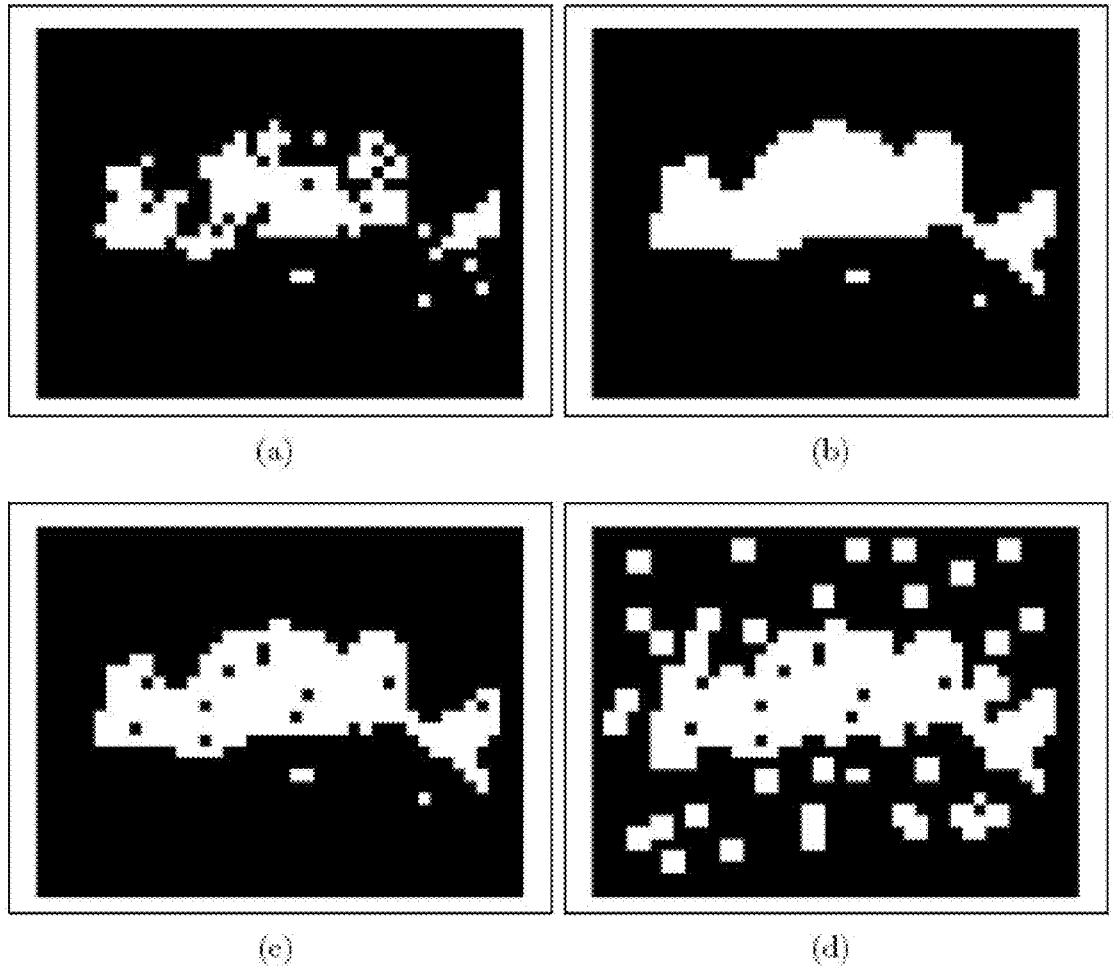
FIG. 5 illustrates by way of an example the functioning of the block selector.

An functional scheme of the block selector 22 is shown in FIG. 4, whereas a processing example is illustrated in FIG. 5, wherein FIG. 5a) depicts sample blocks $M_b$ of pixels of the current image; FIG. 5b) depicts blocks Bmo of pixels obtained by processing the blocks $M_b$ of pixels with a morphological operator; FIG. 5c) depicts blocks Bmop of pixels obtained by deselecting ("pruning") a certain number of blocks Mb; FIG. 5d) depicts blocks Bs of pixels obtained by randomly adding a number of blocks to the blocks Mb. The error matrix computing module 20 provides information about the history of each block (i.e. the Boolean matrix $M_b$). This is the start information of the selection algorithm. First of all, the significant block positions provided by $M_b$ are propagated into the neighborhood through morphological operators, producing a $B_{mo}$ positions matrix (step 24). This step embodies spatial similarity considerations (typically the neighbors of a significant vector are also significant vectors) thus enhancing the performance of the pre-filtering module 14. In fact some filtering criteria take into account neighbors behavior and may not be effective in absence of a neighborhood.

In order to satisfy the upper bound constraint in a hardware application, a pruning step is contemplated (step 26). This step eliminates in a uniform way vectors in excess of the percentage threshold. The novel positions matrix $B_{mop}$ is determined. Having so far considered selectHistoty*maxVectorNumber vectors, the other vectors are randomly selected (step 28). In order to provide neighborhood information to each selected block, they may be chosen by groups of four.

Figure 6:
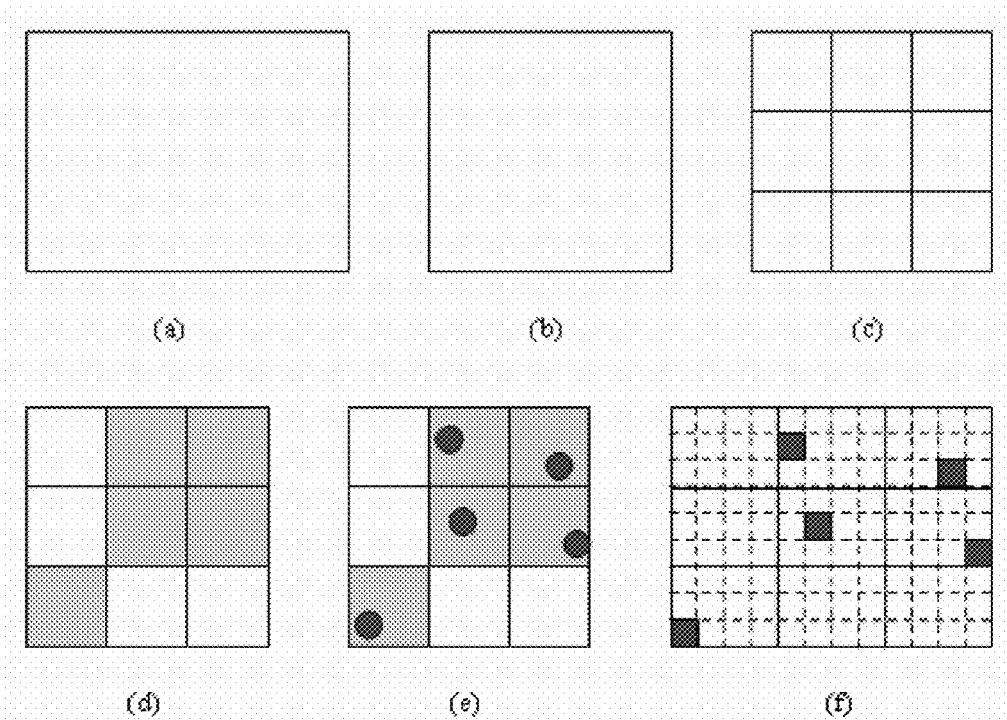
FIG. 6 illustrates selection steps executed by the random selector of FIG. 4.

In order to force an uniform spatial distribution, the following algorithm, illustrated in FIG. 6, may be used although other effective algorithms may be easily devised:

1. The rectangle image is transformed in a square image. The edge of the square is equal to the smaller rectangle size.
2. The square image is divided into $M^2$ square regions. To select N groups of blocks, M is the smaller integer that satisfies $M^2 > N$.
3. N square regions are randomly selected from the available $M^2$.
4. For each selected region a real point is randomly selected.
5. The 2D coordinates of the selected points are transferred in the original rectangle and quantized.

To cope with possible overlaps, the above steps may be iteratively repeated until every group of blocks has been placed. Each new iteration starts with the residual elements (blocks not yet inserted) of the previous one. However the overall number of iterations may be fixed in advance (an upper bound is necessary to meet real-time computational capabilities).

For example, the random insertion step, starting from $B_{mop}$ computes a $B_s$ position matrix. This matrix, together with the time t frame and the time t−1 frame, constitutes the input of the BMA module.

Pre-Filtering

The BMA module 12 typically computes many wrong motion vectors. To filter out these vectors, not useful for global motion estimation, the following considerations may be utilized to select useful vectors:

the SAD (sum of absolute difference) values are relatively low (effective match);

local motion vectors have similar values in their neighborhood (motion continuity); and local motion vectors related to homogeneous blocks are not significant.

The above rules have been derived from results of an exhaustive experimental phase devoted to achieve a suitable trade-off between overall complexity and real-time constraints. Accordingly, four indexes: SAD (goodness of matching), NS (neighborhood similarity), UnhomX and UnhomY (gradient information along x and y axes respectively) have been derived.

$$SAD = \sum_{h=0}^{H-1}\sum_{k=0}^{L-1} |B_1(h,k) - B_2(h,k)|$$

where $B_1$ and $B_2$ are two corresponding blocks of the current frame and of the previous frame, respectively, of L×H size.

$$NS(i,j) = \frac{1}{8}\sum_{k=-1}^{1}\sum_{h=-1}^{1} |Mv_x(i,j) - Mv_x(i+k, j+h)| + |Mv_y(i,j) - Mv_y(i+k, j+h)|$$

where $Mv_x(i,j)$ and $Mv_y(i,j)$ are the components (along x and y axes respectively) of local motion vector of yhe block (i,j).

$$UnhomX = \sum_{h=1}^{H}\sum_{k=1}^{L} |B(h,k) - B(h-1,k)|$$

$$UnhomY = \sum_{h=1}^{H}\sum_{k=1}^{L} |B(h,k) - B(h,k-1)|$$

where B is a block of L×H size.

Figure 7:
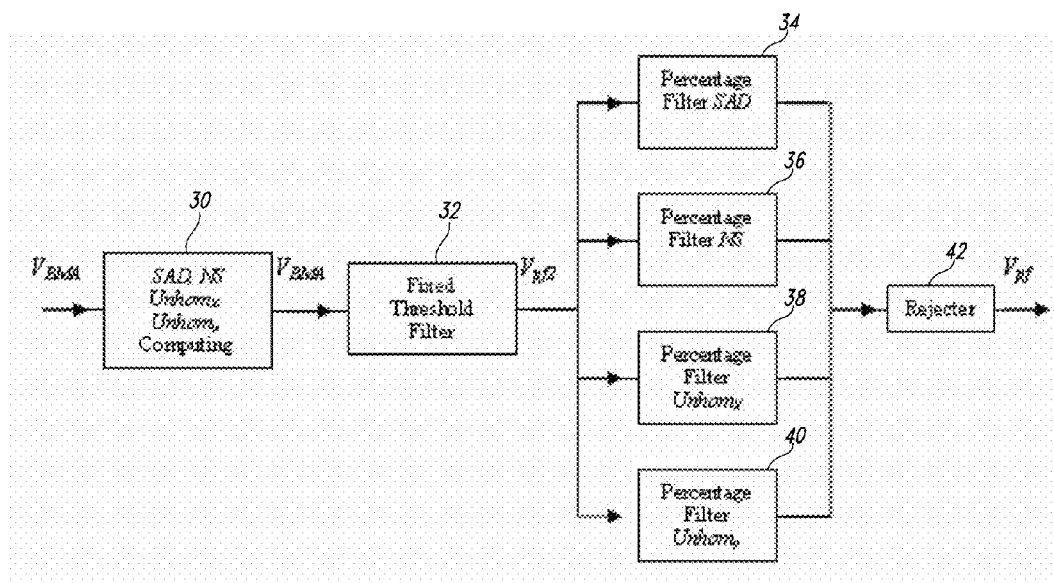
FIG. 7 illustrates process steps carried out by the block pre-filtering block of FIGS. 1 and 2.

The pre-filtering module 14, depicted in FIG. 7, filters local motion vectors by first computing first the values SAD, NS, UnhomX, UnhomY (step 30). All the vectors with both UnhomX and UnhomY less than $th_{Hom}$ (a threshold experimentally fixed) are filtered out (step 32). Starting from $V_{BMA}$ vectors, $V_{pf2}$ vectors are produced. The $V_{pf2}$ vectors are then sorted in ascending order according to SAD (and NS) values, labeling also a certain percentage $p_{pf1}$ ($p_{pf2}$) of vectors of high SAD (NS) values as "deleted" (steps 34, 36). Moreover $V_{pf2}$ vectors are sorted in descending order according to UnHomX (and UnHomy) values, labeling a certain percentage $p_{pf3}$ of vectors of low UnhomX (Unhomy) values as "deleted" (steps 38, 40). Finally the labeled vectors are discarded, thus producing as final output a set of vectors $V_{pf}$ (step 42).

The above described filtering is devoted to eliminate all wrong vectors computed by a generic BM algorithm. However, if there are moving objects in the scene, there will be are vectors correctly computed by BM, and therefore unfiltered out by the pre-filtering module 14, that can be filtered out in order to achieve a good inter-frame parameters estimation for the determination of spurious motion (jitter). If the moving objects in the scene are relatively small, their vectors probably will be rejected by processing them by the robust estimator module 18. On the contrary if the moving objects are relatively large (equal or greater than 50% of the scene), single image information is not enough to filter out these vectors. It will be appreciated that the motion vectors associated with the actual motion of objects are filtered out from the determination of spurious motion, but those motion vectors are not completely discarded and become part of the filtered digital output image.

Figure 8:
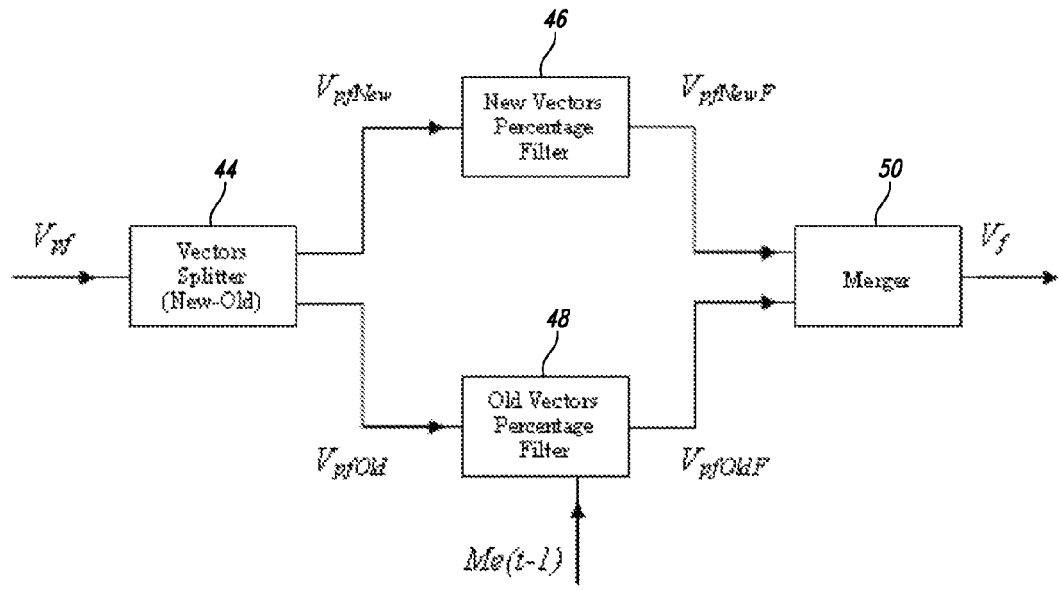
FIG. 8 illustrates process steps carried out by the memory filter of FIGS. 1 and 2.

In order to enhance robustness of the algorithm in dealing with the above identified particularly demanding situations, the memory filter module 16 utilizes previous frame information, according to the scheme of FIG. 8.

All the $V_{pf}$ vectors are split into $V_{pfnew}$ (vectors not belonging to $V_{pf}$ in the previous iteration t−1) and $V_{pfOld}$ (vectors belonging to $V_{pf}$ in the previous iteration t−1) (step 44). A percentage $P_{mf1}$ of $V_{pfnew}$ vectors is then rejected, being considered less reliable than $V_{pfOld}$ vectors (step 46).

The remaining unrejected are denominated $V_{pfnewF}$. On the basis of the $M_e(t-1)$ vector error values, the $V_{pfOld}$ vectors are sorted and filtered out (a percentage $p_{mf2}$ with relatively high error) (step 48). The remaining unrejected vectors are denominated $V_{pfOldF}$ and finally the $V_{pfnewF}$ and the $V_{pfOldF}$ vectors are merged together to produce the filtered $V_f$ vectors (step 50).

Robust Estimator

Global motion between successive frames can be estimated with a two-dimensional similarity model, usually a good trade-off between effectiveness and complexity. Other estimation models (of different complexity) may substitute the exemplary model that is described hereinbelow. This model describes inter-frame motion using four different parameters, namely two shifts, one rotation angle and a zoom factor, and it associates a point $(x_i, y_i)$ in frame In with a point $(x_f, y_f)$ in frame $I_n+1$ with the following transformation:

$$\begin{cases} x_f = x_i\lambda\cos\theta - y_i\lambda\sin\theta + T_x \\ y_f = x_i\lambda\sin\theta + y_i\lambda\cos\theta + T_y \end{cases}$$

where $\lambda$ is the zoom parameter, $\theta$ the rotation angle, $T_x$ and $T_y$ respectively X-axis and Y-axis shifts. Considering N motion vectors we obtain the following over-constrained linear system:

$$A \cdot p = b;$$

$$A = \begin{pmatrix} x_{i1} & -y_{i1} & 1 & 0 \\ \vdots & \vdots & \vdots & \vdots \\ x_{in} & -y_{in} & 1 & 0 \\ y_{i1} & x_{i1} & 0 & 1 \\ \vdots & \vdots & \vdots & \vdots \\ y_{in} & x_{in} & 0 & 1 \end{pmatrix}$$

$$p = \begin{pmatrix} a \\ b \\ c \\ d \end{pmatrix};$$

$$b = \begin{pmatrix} x_{f1} \\ \vdots \\ x_{fn} \\ y_{f1} \\ \vdots \\ y_{fn} \end{pmatrix}$$

where $a = \lambda \cdot \cos\theta$, $b = \lambda \cdot \sin\theta$, $c = T_x$, $d = T_y$.

Vectors computation may be affected by noise so it is useful to apply a linear least squares method on a set of redundant equations to obtain the parameters vector.

$$p = (A^t \cdot A)^{-1} \cdot A^t \cdot b$$

All the similarity model parameters $\lambda$, $\theta$, $T_x$, $T_y$ can be easily derived from p vector components in the following way:

$$\lambda = \sqrt{a^2 + b^2}$$

$$\theta = \tan^{-1}(b/a)$$

$$T_x = c$$

$$T_y = d$$

A whole set of local motion vectors will likely include wrong matches or correct matches pertaining to self-moving objects in the filmed scene. Obviously there will likely be some "correct" pairs that in fact represent camera shakes but many points of the scene will not correlate to such an apparent motion information. The least squares method does not perform well when there is a large portion of outliers in the total number of features, as in this case. However, outliers can be identified and filtered out of the estimation process, thus achieving a better accuracy.

In order to obtain real-time performances a fast rejection technique may be implemented as follows (FIG. 9):

Starting from $V_f$ values, a first least squares estimation of the inter-frame transformation parameters ($\lambda_1, \theta_1, T_{x1}, T_{y1}$) is computed (step 52).

For each $V_{pf}$ element, the estimation computes (steps 54, 56) two error measures (E1, E2) given by the following formula:

$$E_1 = e_x^2 + e_y^2$$

$$E_2 = \frac{((x_s - x_i) \cdot (x_f - x_i) + (y_s - y_i) \cdot (y_f - y_i))^2}{snorm_1 \cdot snorm_2}$$

$$snorm_1 = (x_s - x_i)^2 + (y_s - y_i)^2$$

$$snorm_2 = (x_f - x_i)^2 + (y_f - y_i)^2$$

$$e_x = x_s - x_f$$

$$e_y = y_s - y_f$$

wherein ($x_i$, $y_i$) is the center of a pixel block (relative to a local vector) in the t−1 frame, ($x_f$, $y_f$) is the position of the block in the t instant frame computed by BMA, ($x_s$, $y_s$) is the position of the block estimated according to the inter-frame parameters ($\lambda_1, \theta_1, T_{x1}, T_{y1}$).

According to the error E1 (and E2), the estimator 18 sorts all $V_{pf}$ elements in increasing order and filters out a percentage of vectors presenting a relatively large error value (step 58). The remaining unfiltered out vectors are denominated $V_s$. Starting from these $V_s$ values, the estimator computes anew the least squares estimation of the inter-frame transformation parameters ($\lambda, \theta, T_x, T_y$) (step 60).

Figure 9:
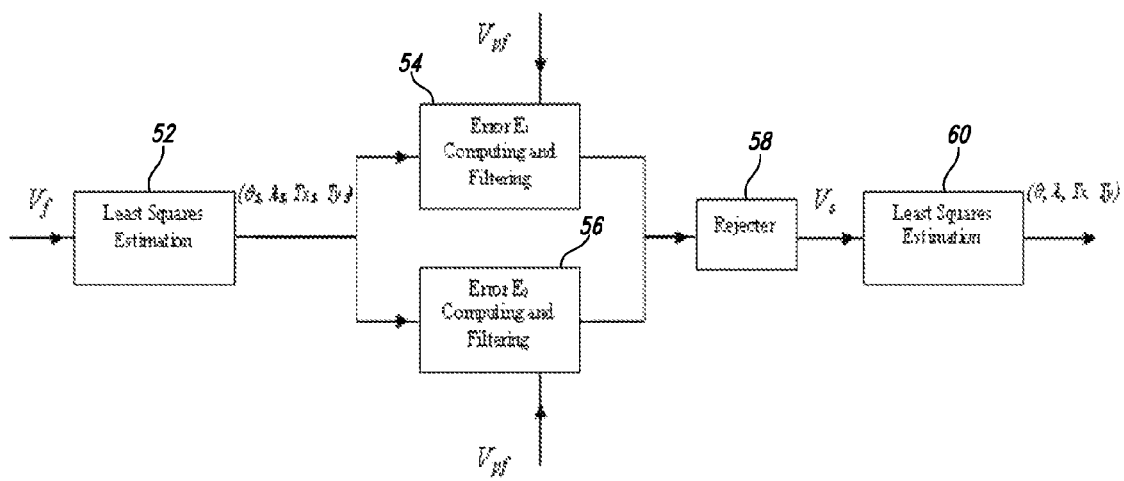
FIG. 9 illustrates process steps carried out by the robust estimator of FIGS. 1 and 2.

A diagram describing how the robust estimator 18 works is shown in FIG. 9.

Figures 10, 11:
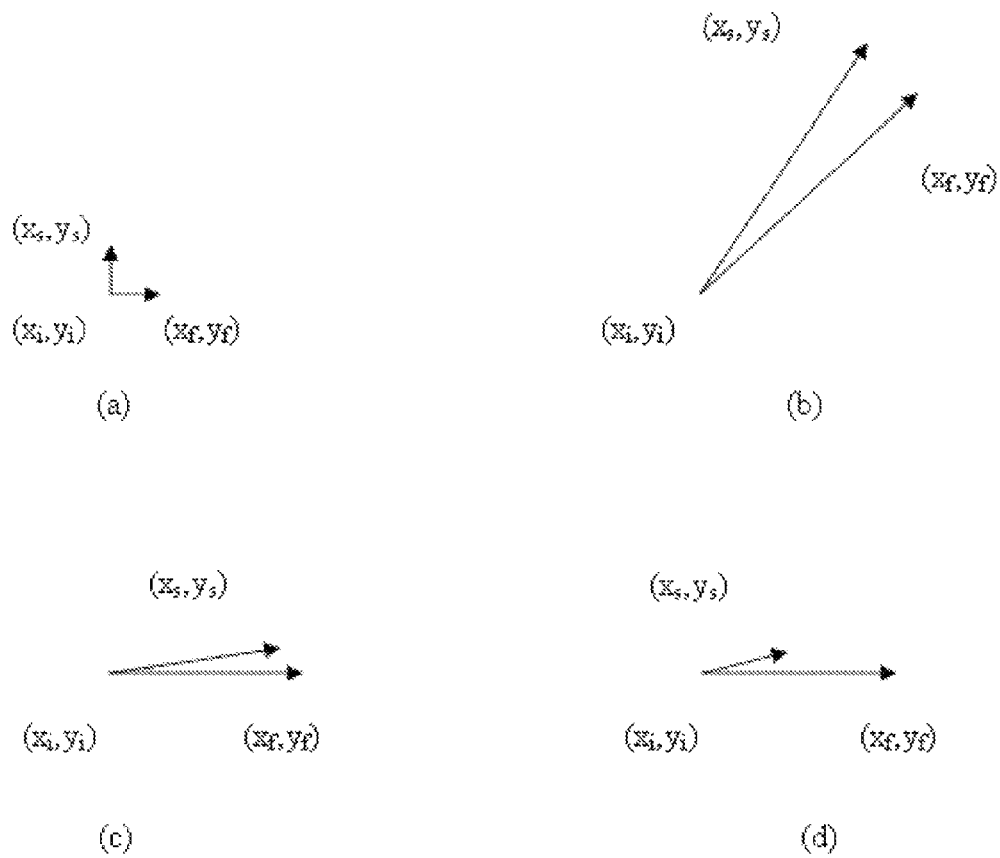
FIG. 10 depicts four pairs of motion vectors, wherein the Euclidean distances between the vectors of the pairs (a) and (b) and the cosine of the angle between the vectors of the pairs (c) and (d) are the same.
FIG. 11 illustrates an example of how the error vectors Me for each block of pixels of the current image is generated by the error matrix computing block.

As depicted in FIG. 10, the error measure E1 is the square Euclidean distance between estimated and measured motion vectors whereas E2 is the square of the cosine of the angle between them. Both E1 and E2, sometimes fail to consider reliable vectors that significantly differ from the real frame motion, however by combining them together these evaluation errors are markedly reduced.

Error Matrix Computing

For each $V_{pf}$ element the estimator 18 computes an error (Euclidean distance) used to fill the $M_e$ error matrix. The Euclidean metric is relatively simple to compute and able to efficiently distinguish between vectors belonging to objects entering in the scene and vectors describing movements of objects in the scene. Usually $V_{pf}(t)$ contains elements corresponding to blocks that were not present in $V_{pf}(t-1)$. Hence some vectors have not an $M_e$ entry when they are considered in the memory filter 16. In order to partially solve this problem, an error vector's value is propagated to the neighborhood of the vector, by simply copying the error value into a neighbors vector that does not have any error value associated with it. The algorithm may be computed from left to right and from up to down as depicted in FIG. 11.

This module also produces the $M_b$ Boolean matrix. Each element of the matrix is true if the corresponding vector belongs to Vs (i.e. the reliable vectors used to compute the inter-frame parameters estimation).

Periodic Pattern Analyzer

The above-described system usually works well in every condition. However, it has been found that some particular scenes may cause problems if they contains large portions having a regular or substantially regular texture. With these scenes, in fact, some BMA may be deceived by these extended patterns because of their pseudo periodicity thus creating multiple matchings that may degrade spurious motion estimation performance of the system.

In order to reduce this problem, according to a more sophisticated embodiment of the method, a fast fuzzy logic classifier able to find regular and low distorted near regular textures, taking into account the constraints of video stabilization applications, has been thought of and may be optionally included in the system. The fuzzy logic classifier can be effectively used as a filtering module in a block-based video stabilization method and implementing system.

Figure 12:
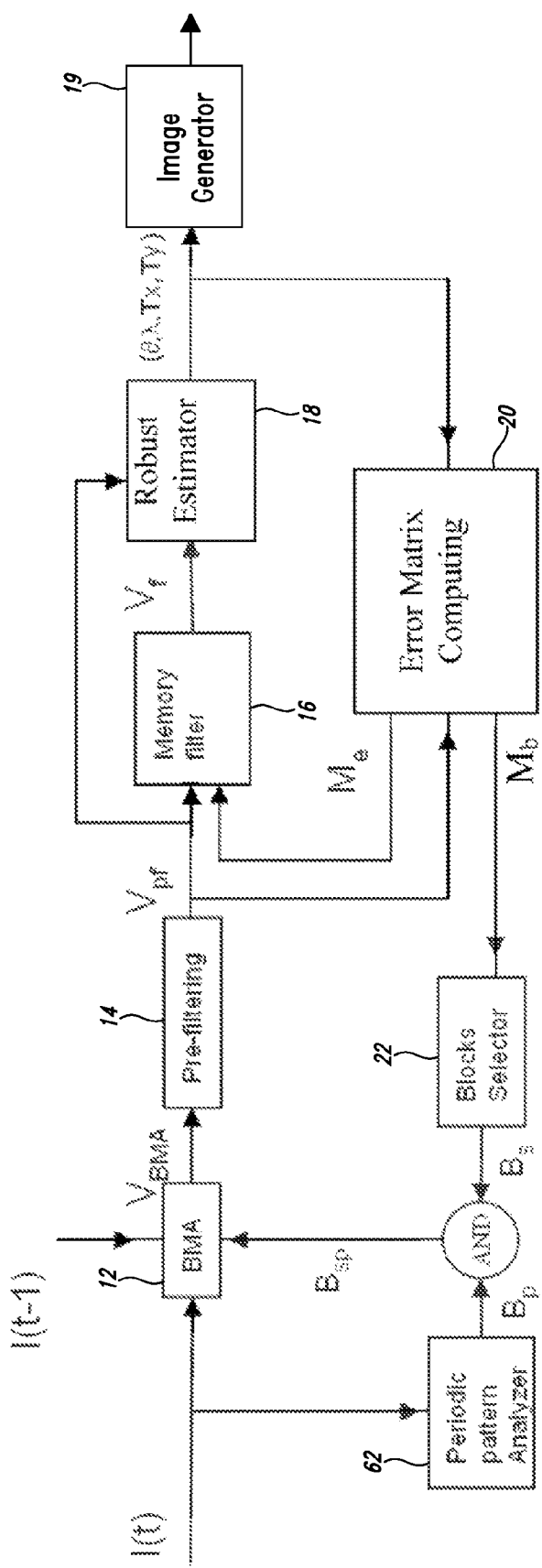
FIG. 12 depicts a third embodiment of the system for estimating roto-translational and zooming parameters of video sequence frames, embodying a periodic pattern analyzer based on fuzzy logic for recognizing specific patterns in the frame to be processed.

According to this enhanced embodiment, the overall block based architecture is shown in FIG. 12.

The periodic pattern analyzer 62 detects if a block is to be taken as significant for the intent of the method in terms of periodicity of pattern. The BMA computes the error Me of each block if both the periodic pattern analyzer 62 and the block selector 22 affirm it to be a reliable block.

Figure 13:
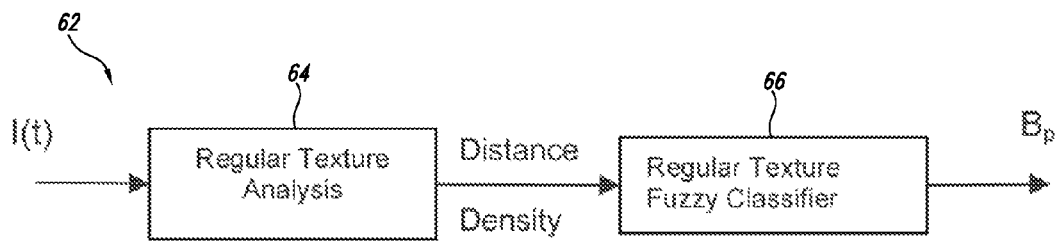
FIG. 13 illustrates the process steps carried out by the periodic pattern analyzer of FIG. 12.

As shown in FIG. 13, the periodic pattern analyzer 62 is substantially composed of two parts: a regular texture analysis block 64 for retrieving two statistics for the decision (distance and density) and a regular texture fuzzy classifier block 66 for deciding if the block can be used or not (i.e. the output $B_p$).

Regular Texture Analysis

In real images there are many regular and quasi regular textured areas corresponding to objects such as: buildings, wallpapers, windows, floors, etc. In particular regular texture and quasi-regular (low distortion) texture, due to the implication of multiple matching candidates, are known to create problems to motion estimation algorithms. On the contrary in presence of relatively highly distorted quasi-regular texture (very often created by perspectively skewed patterns) video stabilization algorithms typically work well. Due to the limited number of samples in each selected patch and to the spectral leakage that disperses frequencies over the entire spectrum, a simple analysis (with appropriate thresholding) on Fourier peaks is not effective.

A fuzzy classifier has been found outstandingly effective in detecting regularly textured pattern in presence of some predefined constraints. It is based on Fourier domain analysis taking into account the following considerations, illustrated in FIGS. 14A, 14B, 14C, 14D:

the largest Fourier spectrum values of a periodic signal have a greater distance from the axes origin than aperiodic signal values; and Fourier components of periodic signals typically have a lower density than aperiodic signal values.

The classifier makes use of the following two formulas:

$$distance = \frac{\sum_{i=-\frac{N}{2}}^{\frac{N}{2}-1} \sum_{j=-\frac{M}{2}}^{\frac{M}{2}-1} f_a(i,j) \cdot d(i,j)}{\sum_{i=-\frac{N}{2}}^{\frac{N}{2}-1} \sum_{j=-\frac{M}{2}}^{\frac{M}{2}-1} f_a(i,j) - f_a(0,0)}$$

where d(i,j) is the Euclidean distance from the axes origin and $f_a(i,j)$ is the Fourier spectrum component (defined in [−N/2, N/2−1]×[−M/2, M/2−1]) of a sequence of size N×M.

$$density = \frac{\sum_{k=1}^{componentsNumber} neighbors(k)}{componentsNumber}$$

where componentsNumber represents the number of non-zero values of the Fourier spectrum and neighbors(k) the number of non-zero values close to the component k. The concept of closeness depends on the constraints of the particular application.

Figure 15:
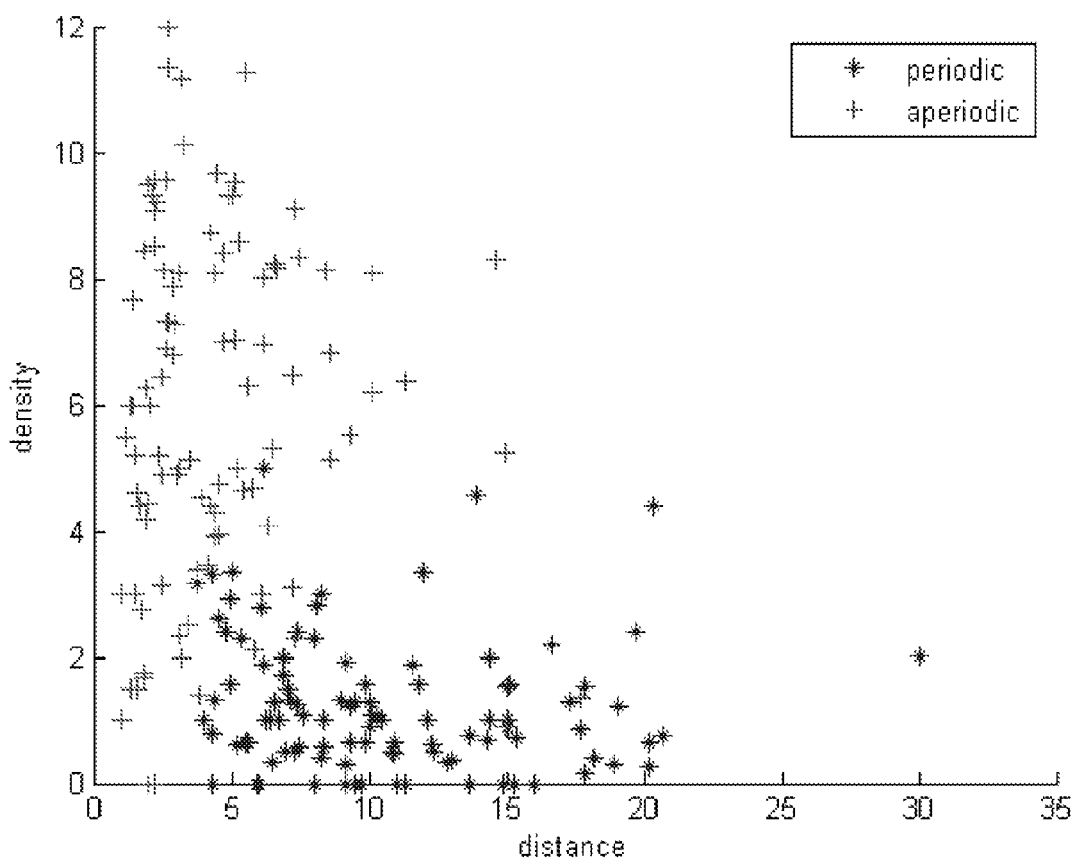
FIG. 15 is an exemplary graph representation of the parameters "density" and "distance" obtained for a set of test blocks of pixels.
Figure 14A:
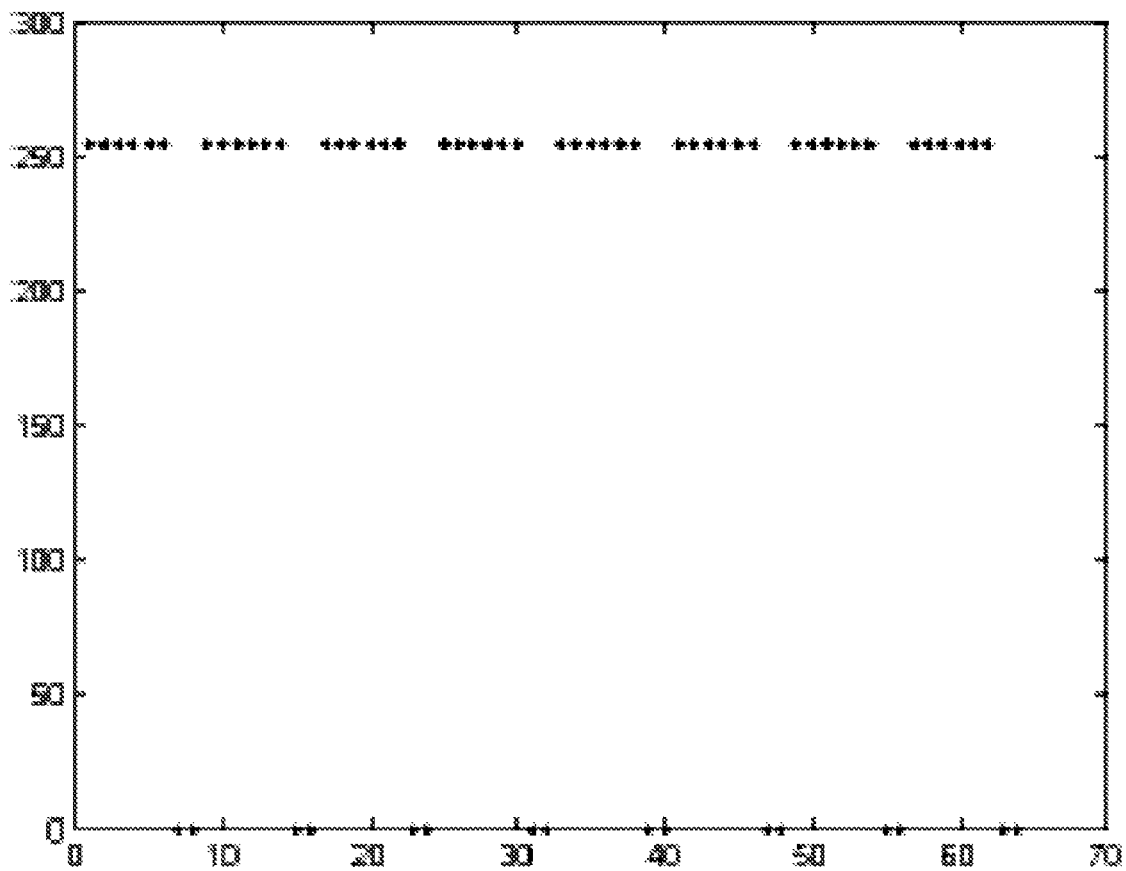
FIG. 14A illustrates an exemplary periodic spatial pattern.
Figure 14B:
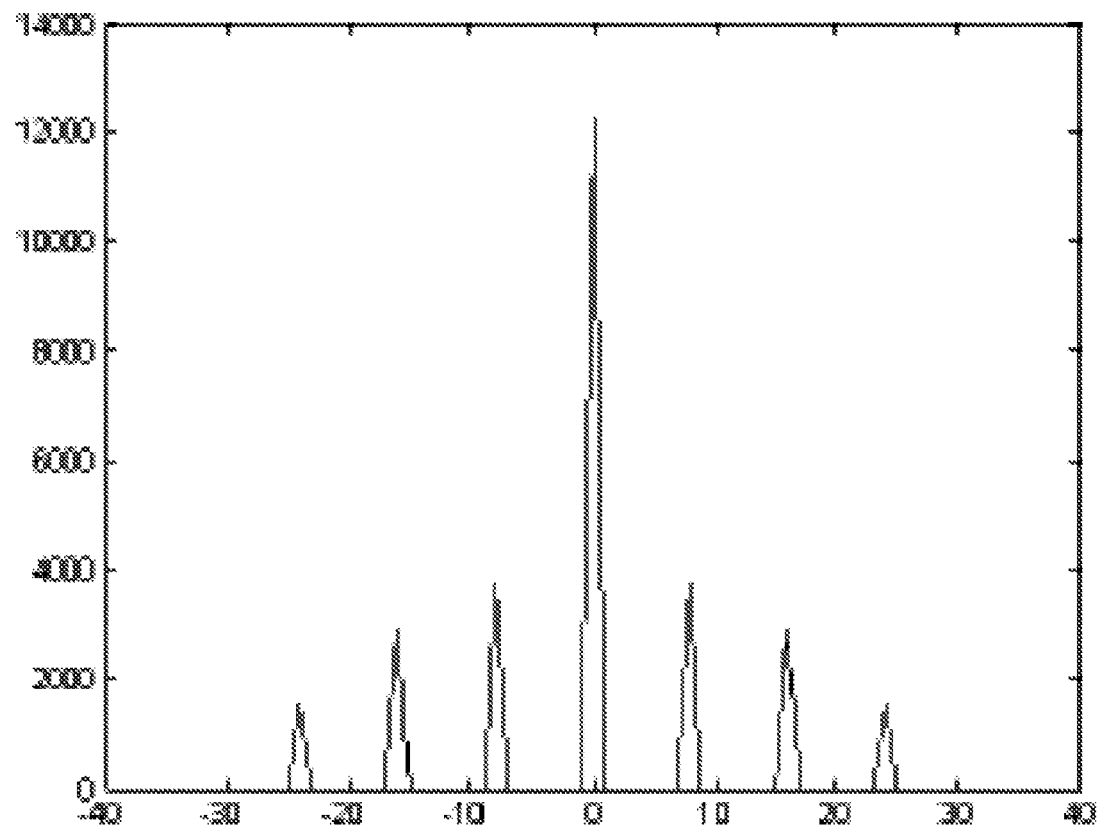
FIG. 14B illustrates a Fourier spectrum for the spatial pattern of FIG. 14A.
Figure 14C:
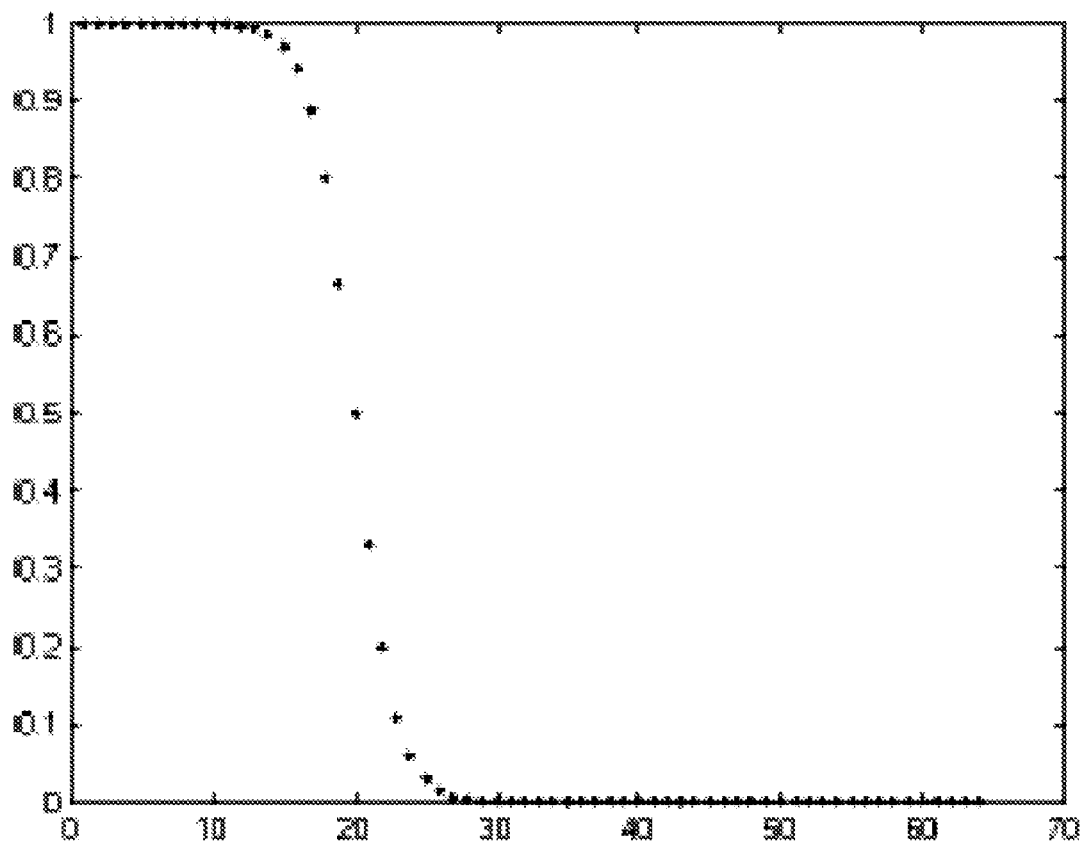
FIG. 14C illustrates an a-periodic spatial pattern.
Figure 14D:
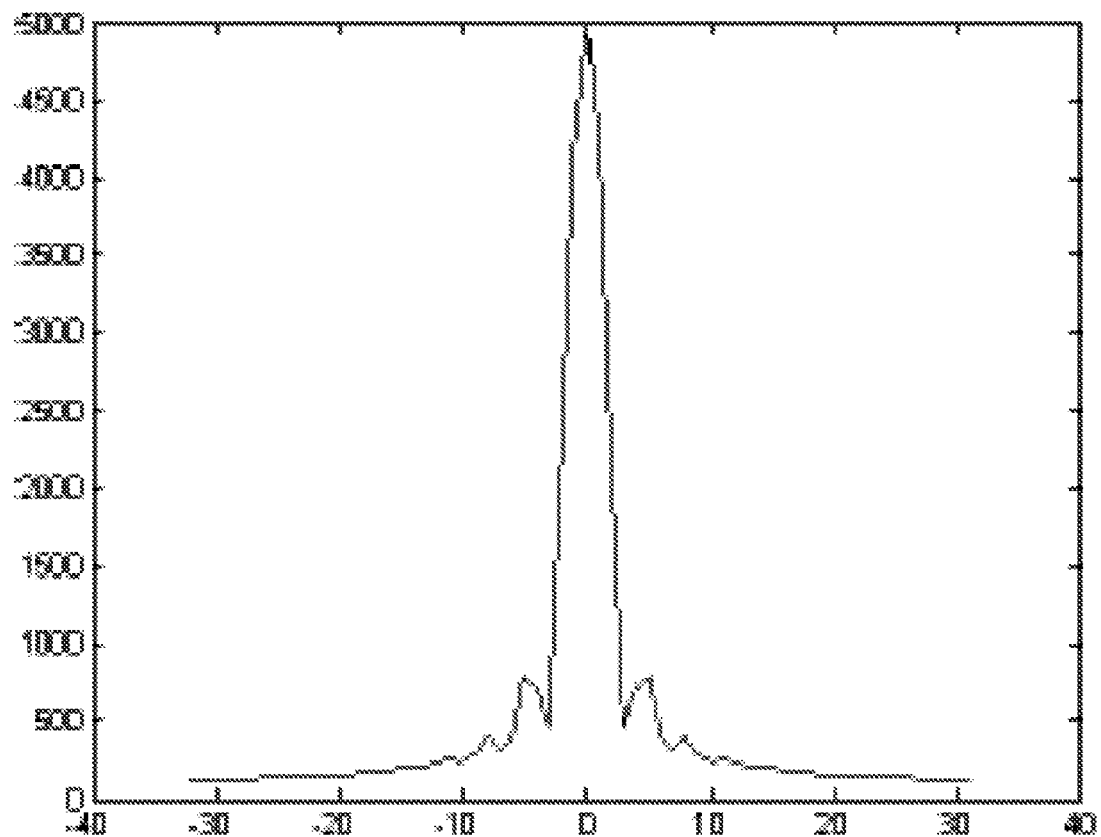
FIG. 14D illustrates a Fourier spectrum for the spatial pattern of FIG. 14C.

In the formulas described above, noise contribution is reduced by considering only the most important Fourier component values. By way of example, all the values less than 30% of the maximum without considering the DC component are discarded. These antecedents (distance and density), as shown in FIG. 15, discriminate pretty well periodic and aperiodic signals.

Regular Texture Fuzzy Classifier

The distance and density formulas can be effectively used as discriminating features in a simple fuzzy classifier with rules listed in Table 1. The membership values of the fuzzy system have been derived considering the peculiarities of the particular application. A video stabilization technique using a BM (block matching) estimation module with block size 16×16 and search range ±16 pixels was considered. Block size defines the upper limit of periodic signal to be detected. The only periodic signals that are taken into account, in this case, have a period of less than 17 pixels.

Figure 16:
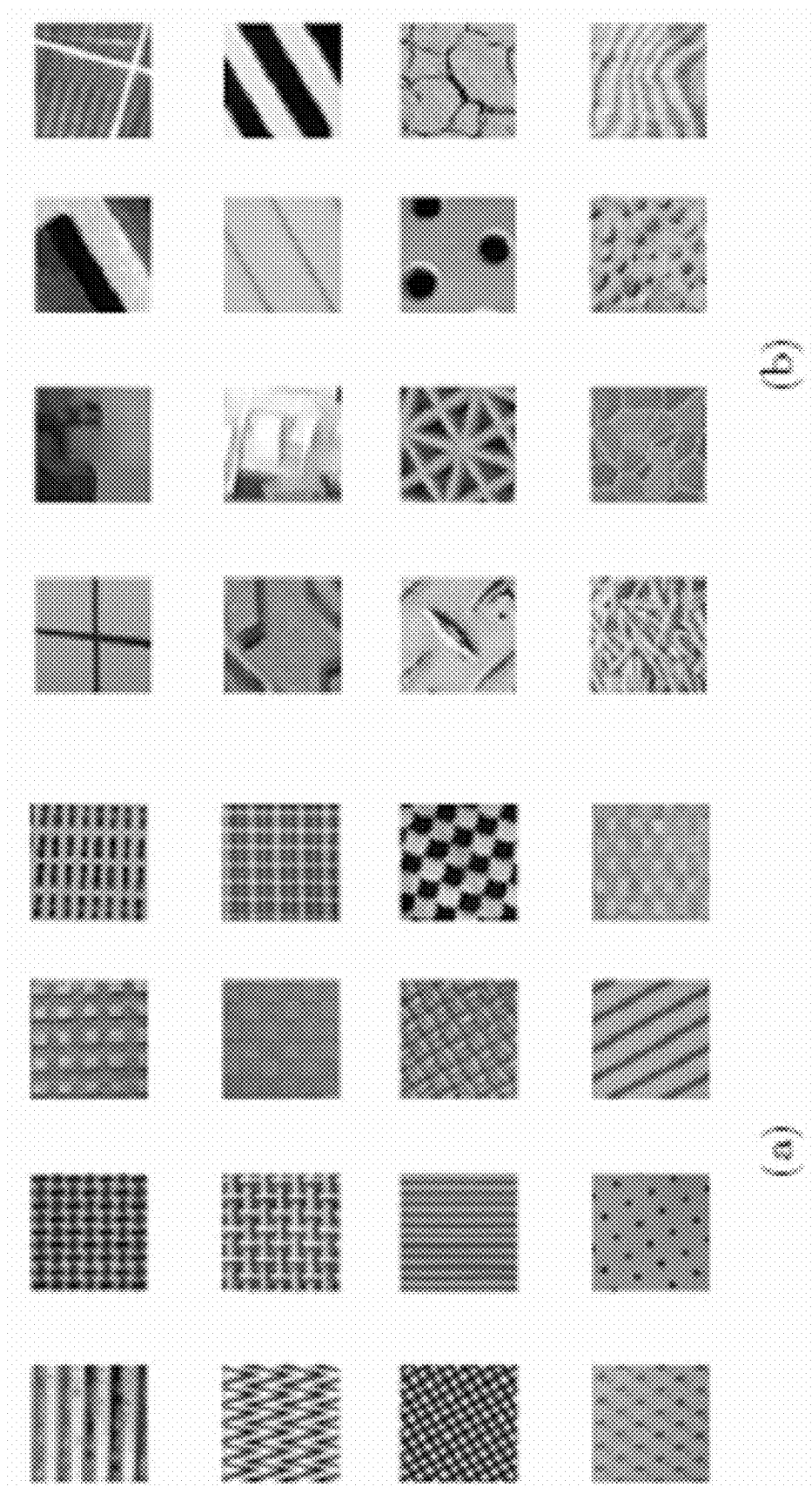
FIG. 16 depicts exemplary blocks of pixels used to train the periodic pattern analyzer of FIG. 12.

A proper dataset containing both periodic and a-periodic images has been built by considering both synthetic and real texture. In order to have enough precision, images of 64×64 pixels have been selected. All the dataset (200 images) has been manually labeled in two classes: periodic and aperiodic. In the aperiodic group are also present corners, edges, regular texture with period greater than 16 pixel (our motion estimation algorithm, due to its local view considers them aperiodic) and irregular texture, as depicted in FIG. 16.

TABLE 1

Fuzzy rules of the system.

| | distance | | density | | periodicity |
|---|---|---|---|---|---|
| if | Low | and | Low | then | $Low_1$ |
| if | Low | and | Medium | then | $Low_2$ |
| if | Low | and | High | then | Very Low |
| if | Medium | and | Low | then | $High_1$ |
| if | Medium | and | Medium | then | Medium |
| if | Medium | and | High | then | $Low_3$ |

TABLE 1-continued

Fuzzy rules of the system.

| | distance | | density | | periodicity |
|---|---|---|---|---|---|
| if | High | and | Low | then | Very High |
| if | High | and | Medium | then | $High_2$ |
| if | High | and | High | then | $Low_4$ |

The training process, devoted to find membership parameters, has been performed using a continuous genetic algorithm, an optimization and search technique based on the principle of genetics and natural selection. An initial population, usually randomly selected, of possible solutions evolves toward a better solution. In each step some population elements are stochastically selected based on their fitness (the function to be optimized), and new elements are created through some techniques inspired by evolutionary biology (mutation, crossover).

Genetic algorithms [7] have found application in many fields: computer science, engineering, economics, chemistry, physics, etc. . . . For simplifying training a Sugeno fuzzy model [8] was chosen. Genetic optimization is realized by using standard approaches in the field. In particular default crossover and mutation algorithms provided by Genetic Toolbox functions of MATLAB 7 have been used.

To validate the fuzzy classifier, a leave-one-out cross-validation was performed. Accordingly a single data was considered the validation dataset, and the remaining data were considered the training dataset. The validation process was repeated until each data had been used once as validation dataset.

For each input signal the above described fuzzy system produces a value belonging to [0-1] that is related to its degree of periodicity. Considering each fuzzy rule, distance and density values are fuzzyfied through the corresponding input membership functions. These fuzzy values are then combined together by means of the and fuzzy operator (a simple multiplication) producing a weighting value $w_i$. Finally the fuzzy output of the system is obtained combining N rules as follows:

$$periodicity = \frac{\sum_{i=1}^{N} w_i z_i}{\sum_{1}^{N} w_i}$$

where $z_i$ are the membership output values (constants in the zero order Sugeno fuzzy model).

For the exemplary case, a simple thresholding process (threshold equal to 0.5) was chosen as defuzzyfication strategy.

Therefore, the output of the periodic pattern analyzer 62 was:

$$Bp = \begin{cases} true & \text{if } periodicity > 0.5 \\ false & \text{otherwise} \end{cases}$$

Table 2 reports the relative confusion matrix that confirms the robustness of the method for both classes, reaching an overall accuracy of 93%.

TABLE 2

| Confusion matrix. | | |
|---|---|---|
| | periodic | aperiodic |
| periodic | 95 | 5 |
| aperiodic | 9 | 91 |

The above described technique for discriminating blocks of pixels depicting a substantially regular ("periodic") pattern from blocks depicting a substantially irregular ("aperiodic") pattern may be advantageously exploited in any method of enhancing a digital image.

For example, substantially irregular blocks of pixels may be filtered with a common noise filtering algorithm, whilst substantially regular blocks of pixels may be filtered from noise with an edge preserving algorithm or with an edge sharpening algorithm.

Moreover, discriminating regular blocks from irregular blocks of pixels may be a first step of any algorithm of pattern recognition in a digital image.

The above description of illustrated embodiments, including what is described in the Abstract, is not intended to be exhaustive or to limit the embodiments to the precise forms disclosed. Although specific embodiments of and examples are described herein for illustrative purposes, various equivalent modifications can be made without departing from the spirit and scope of the disclosure, as will be recognized by those skilled in the relevant art.

For instance, the foregoing detailed description has set forth various embodiments of the devices and/or processes via the use of block diagrams and examples. Insofar as such block diagrams and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one embodiment, the present subject matter may be implemented via Application Specific Integrated Circuits (ASICs). However, those skilled in the art will recognize that the embodiments disclosed herein, in whole or in part, can be equivalently implemented in standard integrated circuits, as one or more computer programs executed by one or more computers (e.g., as one or more programs running on one or more computer systems), as one or more programs executed by on one or more controllers (e.g., microcontrollers) as one or more programs executed by one or more processors (e.g., microprocessors), as firmware, or as virtually any combination thereof, and that designing the circuitry and/or writing the code for the software and or firmware would be well within the skill of one of ordinary skill in the art in light of the teachings of this disclosure.

When logic is implemented as software and stored in memory, logic or information can be stored on any computer-readable medium for use by or in connection with any processor-related system or method. In the context of this disclosure, a memory is a computer-readable medium that is an electronic, magnetic, optical, or other physical device or means that contains or stores a computer and/or processor program. Logic and/or the information can be embodied in any computer-readable medium for use by or in connection with an instruction execution system, apparatus, or device, such as a computer-based system, processor-containing system, or other system that can fetch the instructions from the instruction execution system, apparatus, or device and execute the instructions associated with logic and/or information.

In the context of this specification, a "computer-readable medium" can be any element that can store the program associated with logic and/or information for use by or in connection with the instruction execution system, apparatus, and/or device. The computer-readable medium can be, for example, but is not limited to, an electronic, magnetic, optical, electromagnetic, infrared, or semiconductor system, apparatus or device. More specific examples (a non-exhaustive list) of the computer readable medium would include the following: a portable computer diskette (magnetic, compact flash card, secure digital, or the like), a random access memory (RAM), a read-only memory (ROM), an erasable programmable read-only memory (EPROM, EEPROM, or Flash memory), a portable compact disc read-only memory (CDROM), digital tape. Note that the computer-readable medium could even be paper or another suitable medium upon which the program associated with logic and/or information is printed, as the program can be electronically captured, via for instance optical scanning of the paper or other medium, then compiled, interpreted or otherwise processed in a suitable manner if necessary, and then stored in memory.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet, are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

REFERENCES

[1] Jyh-Yeong Chang; Wen-Feng Hu; Mu-Huo Cheng; Bo-Sen Chang, Digital Image Translational and Rotational Motion Stabilization Using Optical Flow Technique, Consumer Electronics, IEEE Transaction on Volume 48, Issue 1, Feb. 2002 Page(s):108-115.

[2] S. Auberger and C. Miro, Digital Video Stabilization Architecture For Low Cost Devices, Proceedings of the 4th International Symposium on Image and Signal Processing and Analysis, page 474, 2005.

[3] F. Vella, A. Castorina, M. Mancuso, and G. Messina, Digital Image Stabilization By Adaptive Block Motion Vectors Filtering, IEEE Trans. on Consumer Electronics, 48(3): 796-801, August 2002.

[4] Stanislav Soldatov, Konstantin Strelnikov, Dmitriy Vatolin, Low Complexity Global Motion Estimation from Block Motion Vectors, http://graphics.cs.msu.ru/en/publications/text/ks_sccg06.pdf.

[5] J. Yang, D. Schonfeld, C. Chen, and M. Mohamed, Online Video Stabilization Based On Particle Filters, IEEE International Conference on Image Processing, 2006.

[6] Marius Tico, Sakari Alenius, Markku Vehvilainen, "Method of Motion Estimation for Image Stabilization", in Proc. of IEEE International Conference on Acoustics, Speech, and Signal Processing (ICASSP), vol. 2, pp. 277-280, Toulouse, France, May 14-19, 2006.

[7] R. L. Haupt, S. E. H.: Practical Genetic Algorithms, John Wiley & Sons, Hoboken, N.J., USA, 2004.

[8] Sugeno, M., Industrial Applications of Fuzzy Control, Elsevier Science Inc., New York, N.Y., USA, 1985.

The invention claimed is:

1. A method, comprising:
   filtering, using one or more processors, a current image of an input video sequence from spurious motion effects, the filtering including:
      calculating motion vectors for blocks of pixels of the current image of the video sequence with a block matching algorithm carried out on corresponding blocks of pixels of the current image and of a preceding image that precedes the current image in the sequence;
      selecting a subset of said motion vectors by deselecting:
      motion vectors calculated from blocks of the current image dissimilar from corresponding blocks of the preceding image,
      motion vectors strongly different from motion vectors of surrounding blocks, and
      motion vectors associated with pixels of homogeneous areas of the current image;
      calculating roto-translational and zooming parameters describing spurious global motion between the current image and the preceding image, by processing the motion vectors of said subset through the following recursive procedure:
      calculating, for each current motion vector of said subset, a corresponding expected motion vector estimated in function of roto-translational and zooming parameters relative to the preceding image,
      calculating for each current motion vector of said subset a respective error value in function of the motion vector of the corresponding block of the preceding image and the corresponding expected motion vector,
      comparing said error values with a first threshold and storing in a memory the current motion vectors of said subset having error values that are smaller than said first threshold and deleting from said memory motion vectors previously stored therein having error values that are larger than said first threshold, and
      calculating said roto-translational and zooming parameters for the current image in function of motion vectors stored in said memory and of current motion vectors of said subset; and
   generating a filtered output image from said current image of the input video sequence by compensating spurious motion effects described by said roto-translational and zooming parameters.

2. The method of claim 1, wherein said first threshold is determined for each image such to store in said memory a pre-established number of motion vectors.

3. The method of claim 1, wherein deselecting motion vectors calculated from blocks of the current image dissimilar from the corresponding blocks of the preceding image includes:
   calculating, for a block of pixels of the current image, a sum of absolute values of differences between pixels of said block and of a corresponding block of the preceding image, and
   identifying as dissimilar the two blocks if said sum exceeds a second threshold.

4. The method of claim 1, wherein deselecting motion vectors strongly different from motion vectors of surrounding blocks includes:
   calculating a sum of absolute values of differences between a component of the considered motion vector and corresponding components of surrounding motion vectors, and
   identifying the considered motion vector as strongly different from motion vectors of surrounding blocks if said sum exceeds a second threshold.

5. The method of claim 1, wherein deselecting motion vectors associated with pixels of homogeneous areas of the current image includes identifying a considered block of pixels of the current image as depicting an inhomogeneous area through the following operations:
   calculating, for the considered block of pixels of the current image, a horizontal inhomogeneity parameter as a sum of absolute values of differences between corresponding pixels of said considered block and of an adjacent block in horizontal direction,
   calculating, for the considered block of pixels of the current image, a vertical inhomogeneity parameter as a sum of absolute values of differences between corresponding pixels of said considered block and of an adjacent block in vertical direction,
   comparing said horizontal and vertical inhomogeneity parameters with respective second and third thresholds, and
   identifying said considered block of pixels as depicting a homogeneous area if either or both said second and third thresholds are not exceeded.

6. The method of claim 5, wherein:
   deselecting motion vectors calculated from blocks of the current image dissimilar from the corresponding blocks of the preceding image includes:
      calculating, for a block of pixels of the current image, a sum of absolute values of differences between pixels of said block and of a corresponding block of the preceding image, and
      identifying as dissimilar the two blocks if said sum exceeds a fourth threshold;
   deselecting motion vectors strongly different from motion vectors of surrounding blocks includes identifying a considered motion vector as being strongly different from motion vectors of surrounding blocks through the following operations:
      calculating a sum of a absolute values of a differences between a components of the considered motion vector and corresponding components of surrounding motion vectors, and
      identifying the considered motion vector as strongly different from motion vectors of surrounding blocks if said sum exceeds a fifth threshold; and
   said thresholds from second to fifth are determined such that the number of motion vectors of said subset is a pre-established percentage of the calculated motion vectors.

7. The method of claim 1, further comprising selecting for the current image a set of significant blocks, wherein calculating motion vectors is carried out by processing only said significant blocks.

8. The method of claim 7, wherein said set of significant blocks comprises randomly chosen blocks and blocks of the current image corresponding to significant blocks for the preceding image.

9. The method of claim 8, wherein said set of significant blocks for the current image is determined through the following steps:
processing said blocks of the current image corresponding to significant blocks for the preceding image with a morphological operator, identifying a first intermediate set of blocks of the current image;
identifying a second intermediate set of blocks of the current image by deselecting a number of blocks of said first intermediate set in a spatially uniform fashion; and
identifying said set of significant blocks for the current image as the set composed of the blocks of said second intermediate set and of a number of randomly chosen groups of four adjacent blocks of the current image.

10. The method of claim 1, wherein said error value being either a length of a vector difference between a current motion vector and a corresponding expected motion vector, or a cosine of an angle comprised between the current motion vector and the corresponding expected motion vector.

11. The method of claim 10, comprising:
calculating for each current motion vector of said subset two respective error values, a first error value being a length of a vector difference between a motion vector and a corresponding expected motion vector and a second error value being a cosine of an angle comprised between the motion vector and the corresponding expected motion vector;
comparing said first and second error values with said first threshold and with a second threshold, respectively, and storing in the memory motion vectors of said subset having respective error values that are at the same time smaller than said first threshold and said second threshold and deleting from said memory motion vectors having respective error values the are larger than said first threshold or said second threshold.

12. The method of claim 11, wherein said roto-translational and zooming parameters are calculated through the following steps:
calculating provisional values of said roto-translational and zooming parameters by applying a least squares algorithm only on the motion vectors stored in said memory;
for each of said current motion vectors of said subset having respective error values that are smaller than said first and second thresholds, recalculating said respective error values using said provisional values of said roto-translational and zooming parameters and comparing them again with said first and second thresholds; and
selecting among said subset of current motion vectors, based upon the comparing of the recalculated error values with the first and second thresholds.

13. The method of claim 1, comprising selecting current blocks of pixels used for calculating motion vectors as blocks of the current image corresponding to the blocks of pixels of the preceding image the motion vectors of which have been used for calculating said roto-translational and zooming parameters.

14. The method of claim 13, further comprising determining whether current blocks of pixels eventually to be processed are substantially regular and, in the affirmative case, processing said substantially regular current blocks even if they do not correspond to any of said blocks of pixels of the preceding image.

15. The method of claim 14, wherein said determining step is carried out through a fuzzy logic algorithm.

16. The method of claim 15, wherein said fuzzy logic algorithm comprises:
calculating, for each current block of pixels:
a first parameter distance according to the following formula $$\text{distance} = \frac{\sum_{i=-\frac{N}{2}}^{\frac{N}{2}-1} \sum_{j=-\frac{M}{2}}^{\frac{M}{2}-1} f_a(i,j) \cdot d(i,j)}{\sum_{i=-\frac{N}{2}}^{\frac{N}{2}-1} \sum_{j=-\frac{M}{2}}^{\frac{M}{2}-1} f_a(i,j) - f_a(0,0)}$$

where d(i,j) is a Euclidean distance from an origin of I and j axes and fa(i,j) is a Fourier spectrum component defined in the interval [−N/2, N/2−1]×[−M/2, M/2−1] of a sequence of size N×M,
a second parameter density according to the following formula $$\text{density} = \frac{\sum_{k=1}^{componentsNumber} \text{neighbors}(k)}{componentsNumber}$$

where componentsNumber represents a number of non-zero values of the Fourier spectrum and neighbors(k) a number of non-zero values close to the component k;
discriminating the current block of pixels as either a substantially regular or a substantially irregular pattern by a fuzzy logic decision rule using as antecedents said first and second parameters.

17. The method of claim 16, wherein each of said antecedents is compared with a respective pair of discrimination levels, said current block of pixels being discriminated upon said comparisons.

18. The method of claim 17, comprising determining said discrimination levels by:
procuring a first set of test blocks of pixels showing a periodic pattern and a second set of test blocks of pixels showing an aperiodic pattern;
calculating a mean Euclidean distance and an average number for each of said test blocks;
fixing said discrimination levels through a genetic algorithm processing the mean Euclidean distance and average number, such to minimize a probability of erroneous discrimination.

19. A method, comprising:
generating an enhanced output image by enhancing a digital input image using one or more processors, the enhancing including:
subdividing the input image into blocks of pixels;
discriminating substantially regular from substantially irregular blocks of pixels by calculating, for each current block of pixels:
a first parameter distance according to the following formula $$\text{distance} = \frac{\sum_{i=-\frac{N}{2}}^{\frac{N}{2}-1} \sum_{j=-\frac{M}{2}}^{\frac{M}{2}-1} f_a(i,j) \cdot d(i,j)}{\sum_{i=-\frac{N}{2}}^{\frac{N}{2}-1} \sum_{j=-\frac{M}{2}}^{\frac{M}{2}-1} f_a(i,j) - f_a(0,0)}$$

where d(i,j) is a Euclidean distance from an origin of the I and j axes and fa(i,j) is a Fourier spectrum component defined in the interval [−N/2, N/2−1]×[−M/2, M/2−1] of a sequence of size N×M, a second parameter density according to the following formula $$density = \frac{\sum_{k=1}^{componentsNumber} neighbors(k)}{componentsNumber}$$

where componentsNumber represents a number of non-zero values of the Fourier spectrum and neighbors(k) a number of non-zero values close to the component k;

discriminating the current block of pixels as either a substantially regular or a substantially irregular pattern by a fuzzy logic decision rule using as antecedents said first and second parameters;

processing the substantially regular blocks of pixels with an edge preserving noise filtering algorithm or with an edge sharpening algorithm, generating corresponding enhanced blocks of pixels;

generating said enhanced output image using said enhanced blocks of pixels.

20. The method of claim 19, wherein the enhancing includes comparing of said antecedents with discrimination levels, respectively, and said discriminating includes discriminating said current block of pixels based on said comparing.

21. The method of claim 20, comprising determining said discrimination levels by:
   procuring a first set of test blocks of pixels showing a periodic pattern and a second set of test blocks of pixels showing an aperiodic pattern;
   calculating a mean Euclidean distance and an average number for each of said test blocks;
   fixing said discrimination levels through a genetic algorithm processing the mean Euclidean distance and average number, such to minimize a probability of erroneous discrimination.

22. A non-transitory computer-readable medium comprising contents that cause a computing device to implement a method that includes:
   filtering a current image of an input video sequence from spurious motion effects, the filtering including:
      calculating motion vectors for blocks of pixels of the current image of the video sequence with a block matching algorithm carried out on corresponding blocks of pixels of the current image and of a preceding image that precedes the current image in the sequence;
      selecting a subset of said motion vectors by deselecting:
      motion vectors calculated from blocks of the current image dissimilar from corresponding blocks of the preceding image,
      motion vectors strongly different from motion vectors of surrounding blocks, and
      motion vectors associated with pixels of homogeneous areas of the current image;
      calculating roto-translational and zooming parameters describing spurious global motion between the current image and the preceding image, by processing the motion vectors of said subset through the following recursive procedure:
      calculating, for each current motion vector of said subset, a corresponding expected motion vector estimated in function of roto-translational and zooming parameters relative to the preceding image,
      calculating for each current motion vector of said subset a respective error value in function of the motion vector of the corresponding block of the preceding image and the corresponding expected motion vector,
      comparing said error values with a first threshold and storing in a memory the current motion vectors of said subset having error values that are smaller than said first threshold and deleting from said memory motion vectors previously stored therein having error values that are larger than said first threshold, and
      calculating said roto-translational and zooming parameters for the current image in function of motion vectors stored in said memory and of current motion vectors of said subset; and
   generating a filtered output image from said current image of the input video sequence by compensating spurious motion effects described by said roto-translational and zooming parameters.

23. The non-transitory computer-readable medium of claim 22, wherein the method includes selecting current blocks of pixels used for calculating motion vectors as blocks of the current image corresponding to the blocks of pixels of the preceding image the motion vectors of which have been used for calculating said roto-translational and zooming parameters.

24. The non-transitory computer-readable medium of claim 23, wherein the method includes determining whether current blocks of pixels eventually to be processed are substantially regular and, in the affirmative case, processing said substantially regular current blocks even if they do not correspond to any of said blocks of pixels of the preceding image.

25. The non-transitory computer-readable medium of claim 24, wherein said determining comprises:
   calculating, for each current block of pixels:
   a first parameter distance according to the following formula $$distance = \frac{\sum_{i=-\frac{N}{2}}^{\frac{N}{2}-1} \sum_{j=-\frac{M}{2}}^{\frac{M}{2}-1} f_a(i,j) \cdot d(i,j)}{\sum_{i=-\frac{N}{2}}^{\frac{N}{2}-1} \sum_{j=-\frac{M}{2}}^{\frac{M}{2}-1} f_a(i,j) - f_a(0,0)}$$

where d(i,j) is a Euclidean distance from an origin of I and j axes and fa(i,j) is a Fourier spectrum component defined in the interval $[-N/2, N/2-1] \times [-M/2, M/2-1]$ of a sequence of size N ×M, a second parameter density according to the following formula $$density = \frac{\sum_{k=1}^{componentsNumber} neighbors(k)}{componentsNumber}$$

where componentsNumber represents a number of non-zero values of the Fourier spectrum and neighbors(k) a number of non-zero values close to the component k; and discriminating the current block of pixels as either a substantially regular or a substantially irregular pattern by a fuzzy logic decision rule using as antecedents said first and second parameters.

26. A device, comprising:
filtering means for filtering a current image of an input video sequence from spurious motion effects, the filtering including:
- calculating motion vectors for blocks of pixels of the current image of the video sequence with a block matching algorithm carried out on corresponding blocks of pixels of the current image and of a preceding image that precedes the current image in the sequence;
- selecting a subset of said motion vectors by deselecting:
- motion vectors calculated from blocks of the current image dissimilar from corresponding blocks of the preceding image,
- motion vectors strongly different from motion vectors of surrounding blocks, and
- motion vectors associated with pixels of homogeneous areas of the current image;
- calculating roto-translational and zooming parameters describing spurious global motion between the current image and the preceding image, by processing the motion vectors of said subset through the following recursive procedure:
- calculating, for each current motion vector of said subset, a corresponding expected motion vector estimated in function of roto-translational and zooming parameters relative to the preceding image,
- calculating for each current motion vector of said subset a respective error value in function of the motion vector of the corresponding block of the preceding image and the corresponding expected motion vector,
- comparing said error values with a first threshold and storing in a memory the current motion vectors of said subset having error values that are smaller than said first threshold and deleting from said memory motion vectors previously stored therein having error values that are larger than said first threshold, and
- calculating said roto-translational and zooming parameters for the current image in function of motion vectors stored in said memory and of current motion vectors of said subset; and
an image generator structured to generate a filtered output image from said current image of the input video sequence by compensating spurious motion effects described by said roto-translational and zooming parameters.

27. The device of claim 26, wherein the filtering means includes a fuzzy classifier configured to determine whether current blocks of pixels eventually to be processed are substantially regular and, in the affirmative case, processing said substantially regular current blocks even if they do not correspond to any of said blocks of pixels of the preceding image.

28. The device of claim 27, wherein said fuzzy classifer comprises:
means for calculating, for each current block of pixels:
a first parameter distance according to the following formula $$distance = \frac{\sum_{i=-\frac{N}{2}}^{\frac{N}{2}-1} \sum_{j=-\frac{M}{2}}^{\frac{M}{2}-1} f_a(i,j) \cdot d(i,j)}{\sum_{i=-\frac{N}{2}}^{\frac{N}{2}-1} \sum_{j=-\frac{M}{2}}^{\frac{M}{2}-1} f_a(i,j) - f_a(0,0)}$$

where $d(i,j)$ is a Euclidean distance from an origin of I and j axes and $f_a(i,j)$ is a Fourier spectrum component defined in the interval $[-N/2, N/2-1] \times [-M/2, M/2-1]$ of a sequence of size N ×M,
a second parameter density according to the following formula $$density = \frac{\sum_{k=1}^{componentsNumber} neighbors(k)}{componentsNumber}$$

where componentsNumber represents a number of non-zero values of the Fourier spectrum and neighbors(k) a number of non-zero values close to the component k; and
means for discriminating the current block of pixels as either a substantially regular or a substantially irregular pattern by a fuzzy logic decision rule using as antecedents said first and second parameters.

* * * * *